United States Patent [19]

Yuda

[11] 4,354,566

[45] Oct. 19, 1982

[54] RADIATOR GRILLE FIXING STRUCTURE

[75] Inventor: Takuo Yuda, Yokohama, Japan

[73] Assignee: Nifco Inc., Yokohama, Japan

[21] Appl. No.: 184,872

[22] Filed: Sep. 8, 1980

[30] Foreign Application Priority Data

Sep. 6, 1979 [JP] Japan .......................... 54-122433[U]

[51] Int. Cl.³ ............................................ B60R 19/00
[52] U.S. Cl. .................................... 180/68 P; 29/464;
29/526 R; 293/115; 293/155; 403/405; 411/511
[58] Field of Search ............. 180/68 P, 68 R; 29/428,
29/453, 526 R, 464, 467, 468; 293/155, 102,
115, 117; 403/263, 254, 253, 405, 406, 407, 408,
409, 410; 411/511, 508, 512, 173, 172, 360;
24/305

[56] References Cited

U.S. PATENT DOCUMENTS

| 2,376,167 | 5/1945 | Mitchell | 411/173 |
| 2,627,294 | 2/1953 | Bedford, Jr. | 411/173 |
| 2,782,385 | 2/1957 | Collett | 29/464 X |
| 3,574,899 | 4/1971 | Fisher | 411/172 |

FOREIGN PATENT DOCUMENTS 2151657 4/1973 Fed. Rep. of Germany ...... 293/155

1019798 11/1952 France ............................... 180/69 R
548086 9/1942 United Kingdom ............. 180/69 R Primary Examiner—Joseph F. Peters, Jr.
Assistant Examiner—Milton L. Smith
Attorney, Agent, or Firm—Jerold M. Forsberg; Jack R. Halvorsen

[57] ABSTRACT

In a radiator grille fixing structure having a radiator grille fixing fastener formed of a base plate portion, engaging means provided one each on the opposite sides of the base plate portion and a screw hole bored in the base plate, and a fixing portion of a radiator grille, which fixing portion is provided with a fitting hole for admitting one of the engaging means in the width direction and a perforation provided at a position opposed to the aforementioned screw hole; either the screw hole in the fastener or the perforation in the fitting portion of the radiator grille is elongated in the width direction of the fastener or the fitting portion, permitting the radiator grille which has been brought into temporary attachment to the automobile body through the medium of the aforementioned fastener to be given fine positional adjustment and brought to its exact position relative to the automobile body and finally fixed at that exact position.

3 Claims, 7 Drawing Figures

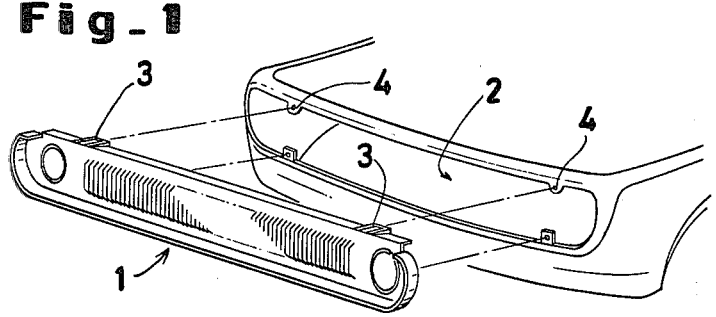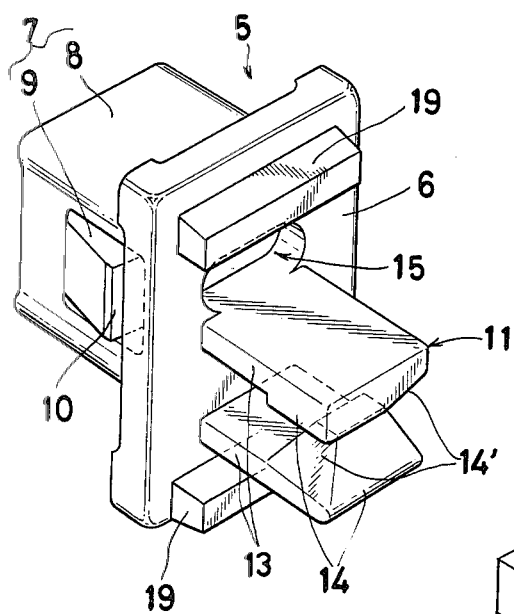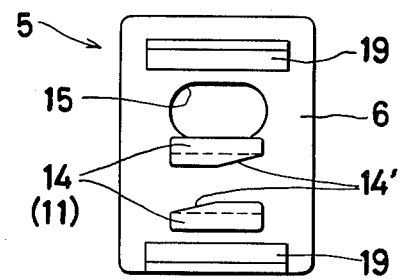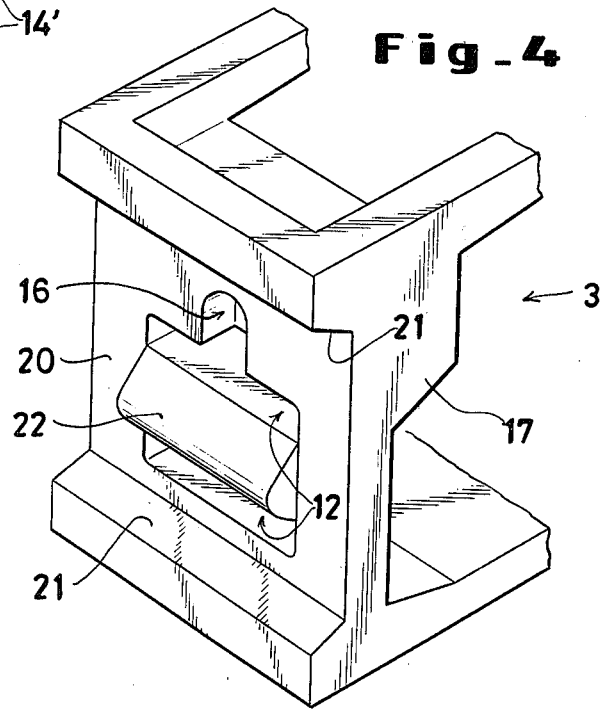

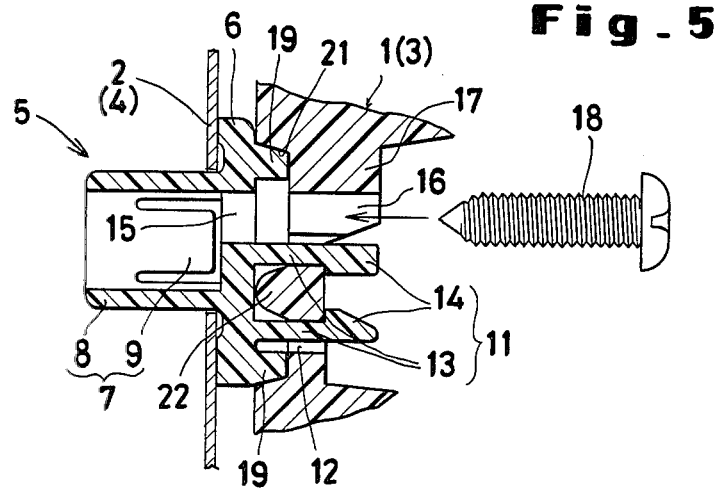
Fig_5
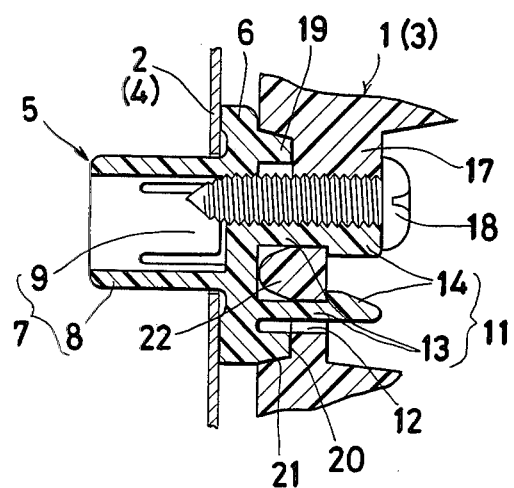
Fig_6
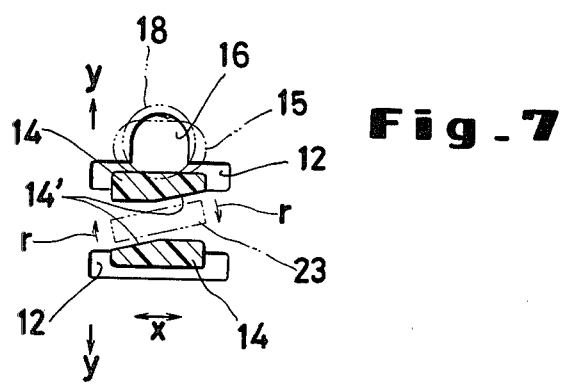
Fig_7

RADIATOR GRILLE FIXING STRUCTURE

BACKGROUND OF THE INVENTION

This invention relates to a structure for fixing a radiator grille to an automobile body.

Generally for the purpose of fixing to an automobile body a radiator grille designed concurrently for radiation of heat and decoration of the front exterior, there is used a method which accomplishes their union by use of screw means and nut means or a method which achieves their union by means of plastic fasteners adapted to come into snapping engagement with each other and attached to the matched positions on the automobile body and the radiator grille. Because of ease of use, the latter method resorting to plastic fasteners has found more popular acceptance. The plastic fasteners generally comprise two sets of engaging means and accomplish the union of the automobile body and the radiator grille by having one set of them secured in the openings formed in the fixing portions on the automobile body side and the other set of them secured in the openings formed in the matched fixing portions on the radiator grille side and bringing the opposed sets of engaging means into mutual engagement. The relative positions of the automobile body and the radiator grille, therefore, is determined by the positions of the openings formed as described at the fastening portions. It is, however, difficult to have such openings formed with perfect positional accuracy. In actuality, slight deformation of plastic grilles or slight positional deviation of openings in the automobile body can impair the positional correspondence between the automobile body and the radiator grille and, in the worst case, prevent the openings on the radiator grille from conforming to those on the automobile body. To preclude this difficulty, there may be conceived an idea of giving a slightly greater width to the openings formed on the automobile body thereby allowing the opposed pairs of openings to conform to each other under all conditions and compensating positional deviation, if any, between the opposed openings. Such a method, if applied to the aforementioned plastic fasteners, proves unsuitable where the aforementioned plastic fasteners are used, because the plastic fasteners cannot absorb unwanted slack produced due to the excess width of the openings. Although the method may prove more advantageous where the union is made by use of screw means and nut means, it suffers from inferiority of the efficiency of the fastening work. With a view to enhancing the efficiency with which radiator grilles are fastened to automobile bodies in the automobile assembly line, a method which first permits simple temporary attachment of a radiator grille to an automobile body and, thereafter, allows them to be brought into exact correspondence to each other through elimination of possible positional deviation by fine adjustments of their relative position has been in demand.

SUMMARY OF THE INVENTION

An object of this invention is to provide a structure which permits a radiator grille to be temporarily attached by a simple operation to an automobile body, then enables the position of the radiator grille to be finely adjusted relative to that of the automobile body to eliminate possible positional deviation therebetween and finally allows them to be retained securely at the positions fixed in consequence of the fine adjustment.

To accomplish the object described above according to the present invention, there is provided a radiator grille fixing structure which comprises a base plate; first engaging means provided on one surface of the base plate and adapted to come into snapping engagement with a fitting hole formed in the fitting portion of an automobile body, second engaging means provided on the other surface of the base plate, having a smaller width than that of a fitting hole formed in the fitting portion of a radiator grille and adapted to come into snapping engagement with the fitting hole; and a screw hole provided on the base plate at the position corresponding to that of a perforation formed in the fitting portion of the radiator grille for admitting screw means.

The screw hole formed in the base plate or the perforation in the fitting portion of the radiator grille is designed to have an increased length in the width direction of the second engaging means. When the automobile body and the radiator grille are brought into temporary attachment to each other through the medium of the fixing structure, the fitting portion of the radiator grille and the fixing structure are given freedom of motion in the width direction of the second engaging means. Owing to this freedom of motion, therefore, the relative positions of the automobile body and the radiator grille can be adjusted to eliminate possible positional deviation therebetween. After this adjustment, the radiator grille can be fixed securely at the exactly corresponding position to the automobile body by passing the screw means through the perforation in the fitting portion of the radiator grille and further driving it into the screw hole at the corresponding position of the base plate.

The other objects and characteristics of the present invention will become apparent from the further disclosure of the invention to be made herein below with reference to the accompanying drawing.

BRIEF DESCRIPTION OF THE DRAWING

FIG. 1 is an exploded view of an automobile body and a radiator grille, illustrating the positions at which the radiator grille fixing structure of the present invention is applied.

FIG. 2 is a perspective view of one embodiment of the radiator grille fixing structure of the present invention.

FIG. 3 is a plan view of the fixing structure of FIG. 2.

FIG. 4 is a perspective view of the fixing structure of FIG. 2, illustrating the positions at which the radiator grille is applied.

FIG. 5 is a sectioned view of the essential part of the embodiment of the fixing structure of this invention, in a state of temporary attachment.

FIG. 6 is a sectioned view of the essential part, in a state of temporary attachment similarly to the state of FIG. 5.

FIG. 7 is an explanatory diagram illustrating fine positional adjustment being made on the fixing structure.

DESCRIPTION OF THE PREFERRED EMBODIMENT

This invention relates to a fixing structure which permits a radiator grille to be readily fixed at an exactly corresponding position to an automobile body.

FIG. 1 illustrates a condition in which a radiator grill 1 is fixed to the frontal portion of an automobile body 2 through the medium of the fixing structure of this invention. For this fixation, a fitting portion 3 of the radiator grille is brought into engagement with a fitting portion 4 of the automobile body. Generally the means to be used for this engagement may be screw means or plastic fasteners, for example. It is quite possible that the fitting holes formed in the mutual fitting portions for admitting such engaging means will deviate from their exact positions by some reason or other. For the conventional fixing structures, measures capable of adjusting for the positional deviation of such fitting holes have not been available. This disadvantage is also overcome by the radiator grille fixing structure of the present invention as illustrated in FIGS. 2 and 3.

This fastener 5 possesses a base plate portion 6 adapted to be interposed between the fitting portion 3 on the radiator grille 1 and the fitting portion 4 on the automobile body 2. The base plate portion 6 is provided on one surface serving as the rear surface thereof with a first engaging portion 7 of a suitable known construction adapted to come into snapping engagement with a fitting hole formed on the fitting portion 4 of the automobile body. In the illustrated embodiment, the first engaging portion 7 is formed of a shank 8 shaped in a rectangular cross section, which extends from the base plate 6 and outwardly protruding, inwardly flexible catch claws 9 formed one each on the opposite lateral sides of the shank 8. The fitting hole in the fitting portion of the automobile body side fitting portion has a rectangular shape in conformity with the cross section of the shank 8.

The engaging means of such a construction as described above in itself is known to the art. With this engaging means, fixation of the fastener to the automobile body is accomplished by inserting the fastener into the rectangular fitting hole of the fitting portion 4 of the automobile body with the shank 8 fitted to the corresponding edges of the fitting hole, causing the catch claws 9 to be bent inwardly and consequently advanced past the edges of the hole and, beyond the hole, returned to their original shape by their own resiliency, thereby to pinch the fitting portion 4 of the automobile body between the protuberances 10 of the catch claws and the opposed surface of the base plate 6. The reason for the rectangular cross section of the shank and the rectangular opening of the fitting hole is that their angular corners fulfill a desirable function of preventing otherwise possible rotation of the fastener around its axis. These rectangular corners, however, do not constitute an essential requirement for the invention. Of course, the first engaging means illustrated in the drawing may be freely replaced by any of various known means available for the same purpose.

The base plate 6 is further provided on the front surface thereof with a second engaging means 11 having a common construction, which is adapted so that it comes into snapping engagement with the fitting hole 12 in the fitting portion 3 illustrated in FIG. 4 when it is pushed into the holes. In the present embodiment, the second engaging means 11 is formed of a pair of leg members 13 extending from the front side of the base plate and inwardly curved catch claws 14 which are respectively provided at the free ends of the leg members. The leg members are provided with a proper space interposed therebetween. Correspondingly, the nearer inner edges of the two fitting holes 12 formed at the corresponding positions in the fitting portion 3 of the radiator grille are separated by the same distance. On the other hand, the heights of the fitting holes 12 are enough for smooth passage of the catch claws 14. When the second engaging portions 11 of this fastener are exactly opposed to the fitting holes 12 and they are pushed in toward each other, the leg members 13 are bent in the mutually separating direction while the catch claws 14 slide inside the fitting holes. After passage through the fitting holes, the catch claws resume their original shape by their own resiliency and come into fast engagement with the edges of the fitting holes. Consequently, the fastener is brought into temporary attachment to the radiator grille 1 as illustrated in FIGS. 5 and 6.

This fastener is provided on the opposite sides thereof with the first and second engaging portions of known art as described above. While the first and second engaging portions are fastened respectively to the automobile body and the radiator grille, the question as to which one of the two portions should be fastened prior to the other is a matter subject to discretion.

Besides the known constructions described so far, this invention contemplates providing the base plate portion 6 of the fastener 5 with a screw hole 15 and the fitting portion 3 of the radiator grille at the matched position with a perforation 16 for passage of a screw means. Either the screw hole 15 or the perforation 16 is given an oblong shape. In the present embodiment, the screw hole 15 formed on the base plate 6 of the fastener has an oblong shape. It is in the direction of the longer axis of this screw hole that the screw means is allowed to move sideways for the purpose of fine adjustment of the relative positions of the fastener and the radiator grille. For example, when the fitting hole 12 opposed to the catch portion 14 of the second engaging means is given a width greater than that of the catch portion 14 as illustrated in FIG. 7, the fastener and the radiator grille can be moved relative to each other in the width direction within the range of the difference between the widths of the leg member 13 and the fitting hole 12. In the present embodiment, the longer axis of the screw hole 15 falls in the same direction as the x-direction, namely in the width direction of the leg member 13.

Particularly in the present embodiment, the screw hole 15 on the fastener is disposed at a position such that part of the inner wall surface falls flush with the rear surface of one of the leg members. The partial wall portion in the perforation which is opposed to the rear surface of the second engaging member 11 is designed to have an ample length so that the vacant space defined by the rear surface of the member 11 and the inner wall portion of the perforation possesses an ample depth when the fitting portion 3 is joined with the fastener 5 as illustrated in FIGS. 5 and 6.

After the fastener 5 has been used for temporary attachment of the automobile body to the first engaging portion 7 and the radiator grille to the second engaging portion 11 respectively, the radiator grille is given fine positional adjustment in the x-direction by utilizing the difference between the width of the leg members and that of the fitting hole 12 illustrated in FIG. 7 and is eventually brought to its exact position.

Thereafter, a tapping screw 18 is driven, for example, in from the side of the perforation 16 on the radiator grille into the axially coinciding screw hole 15 on the fastener to bring the radiator grille into fast union with the fastener and consequently with the automobile body. In this manner, the radiator grille is maintained at its exact position determined in consequence of the fine adjustment described above.

Particularly in the present invention, because the through hole defined by the holes 15 and 16 is made deeper by forming the portion 17 in an increased wall thickness on the fitting portion of the radiator grille as described above, the screw is allowed further to firmly bite into the rear surface of the catch claw 14 and the portion 17 of increased wall thickness. Consequently, the available length of wall to be bitten into by the screw is increased to enhance the stability of the union proportionately. Further, since the screw exerts pressure upon the catch claw 14 from behind the rear surface thereof, the fastness of the union between the catch claw 14 and the corresponding edge of the fitting hole 12 is improved.

Basically, however, the present invention is satisfied when one of the matched holes formed in the fastener and the radiator grille is given a longer axis so that the radiator grille joined with the automobile body through the medium of the present fastener can be moved in the direction of the longer axis thereof in relation to the automobile body. In the embodiment described above, therefore, the two holes 15 and 16 may be disposed at some other suitable position. Otherwise, the perforation 16 in the radiator grille may also be given an oblong shape. Alternatively, the perforation 16 alone may be given an oblong shape instead on the screw hole 15. When the screw hole 15 in the fastener is formed in a circular shape and provided with a screw thread in the inner wall thereof by an ordinary technique, an ordinary bolt can be used as the screw means 18 in the place of the tapping screw.

In the present embodiment, with a view further to precluding occurrence of slack in the direction parallel to the surface of the base plate for the positional adjustment, ribs 19 are raised from the base plate 6 of the fastener parallel to the second engaging portion 11, so that these ribs come into tight contact with the descending surfaces 21 reaching the recessed surface 20 of the radiator grille opposed to the base plate 6 of the fastener. Because of the presence of these ribs, a gap is produced between the surface 20 of the radiator grille and the base plate 6 of the fastener and the portion 22 positioned between the pair of engaging means loses its strength. To make up for the loss of strength, the wall thickness on the fastener side is an increased wall thickness enough to provide required reinforcement.

In the present embodiment, the radiator grille 1 may be optionally removed from the automobile body. For this removal, the radiator grille is brought back to its original state of temporary attachment by driving out the tapping screw 18. After the state of temporary attachment is resumed, the radiator grille can be drawn out of the fastener by spreading the pair of hook-shaped catch claws 14 in the y-direction. The union of the radiator grille with the fastener can be broken by inserting the tip 23 of a screw driver as indicated by a chain line in FIG. 7 between the paired catch claws 14, rotating it in the r-direction and thereby pushing the two claws 4 open. In this case, the opposed surfaces of the paired claws 14 are diagonally cut in the portions 14' opposed diagonally relative to the width direction of the claws, so that the work of spreading the claws 14 will be carried out efficiently with the smallest possible angle of rotation of the screw driver. Of course, the removed radiator grille can be again fastened to the automobile body be repeating the procedure described previously.

As already described, the second engaging portion 11 may be formed in any other known shape than the shape illustrated in the drawing. Further, the number of hook-shaped engaging means may be one instead of two as involved in the preceding embodiment.

According to the present invention, there is provided an efficient radiator grille fixing structure which, as described above, enables a radiator grille to be temporarily attached by a simple operation to an automobile body, permits the relative position of the grille to the automobile body to be finely adjusted and, after completion of the positional adjustment, accomplished fast union of the grille and the automobile body by use of a screw means.

What is claimed is:

1. A structure for fixing a radiator grille to an automobile body, which comprises:
   a base plate,
   a first engaging means provided on one surface of the base plate and adapted to come into engagement with a fitting hole formed on a fitting portion of an automobile body,
   a second engaging means provided on the other surface of the base plate, possessed of a width smaller than the width of a fitting hole formed on a fitting portion of a radiator grille and adapted to come into engagement with said fitting hole of the radiator grille, and
   an oblong screw hole formed in the base plate at a position corresponding to a perforation formed for passage of a screw means in the fitting portion of the radiator grille, with the larger axis of said oblong screw hole falling in the width direction of said second engaging means.

2. A structure for fixing a radiator grille to an automobile body, which comprises:
   (a) a radiator grille fixing fastener provided with
      a base plate,
      a first engaging means provided on one of the opposite surfaces of the base plate and adapted to come into engagement with the automobile body,
      a second engaging means provided on the other surface of the base plate and adapted to come into engagement with the radiator grille, and
      a screw hole formed in said base plate for admitting a screw means, and
   (b) a fitting portion integrally provided in the radiator grille, provided with
      at least one fitting hole adapted to admit the second engaging means of said fastener and possessed of a width large enough for permitting the second engaging means to be moved therein in the width direction, and
      an oblong perforation formed at a position opposed to the screw hole in the base plate of said fastener, with the larger axis thereof falling in the direction of the fitting hole.

3. The structure according to claim 1 or claim 2, wherein the second engaging means is in the shape of a hook having a leg member extending from the base plate of the fastener and a catch claw rising at the leading end of the leg member, the screw hole in the base plate is disposed at a position such that it borders on the rear surface of the second engaging means, the perforation in the fitting portion of the radiator grille is disposed at a position such that it borders on the fitting hole of said fitting portion, and the edge of said perforation has an increased wall thickness on the side destined to constitute a rearward surface when the second hook-shaped engaging means is brought into engagement with said fitting hole.

* * * * *